UNITED STATES PATENT OFFICE.

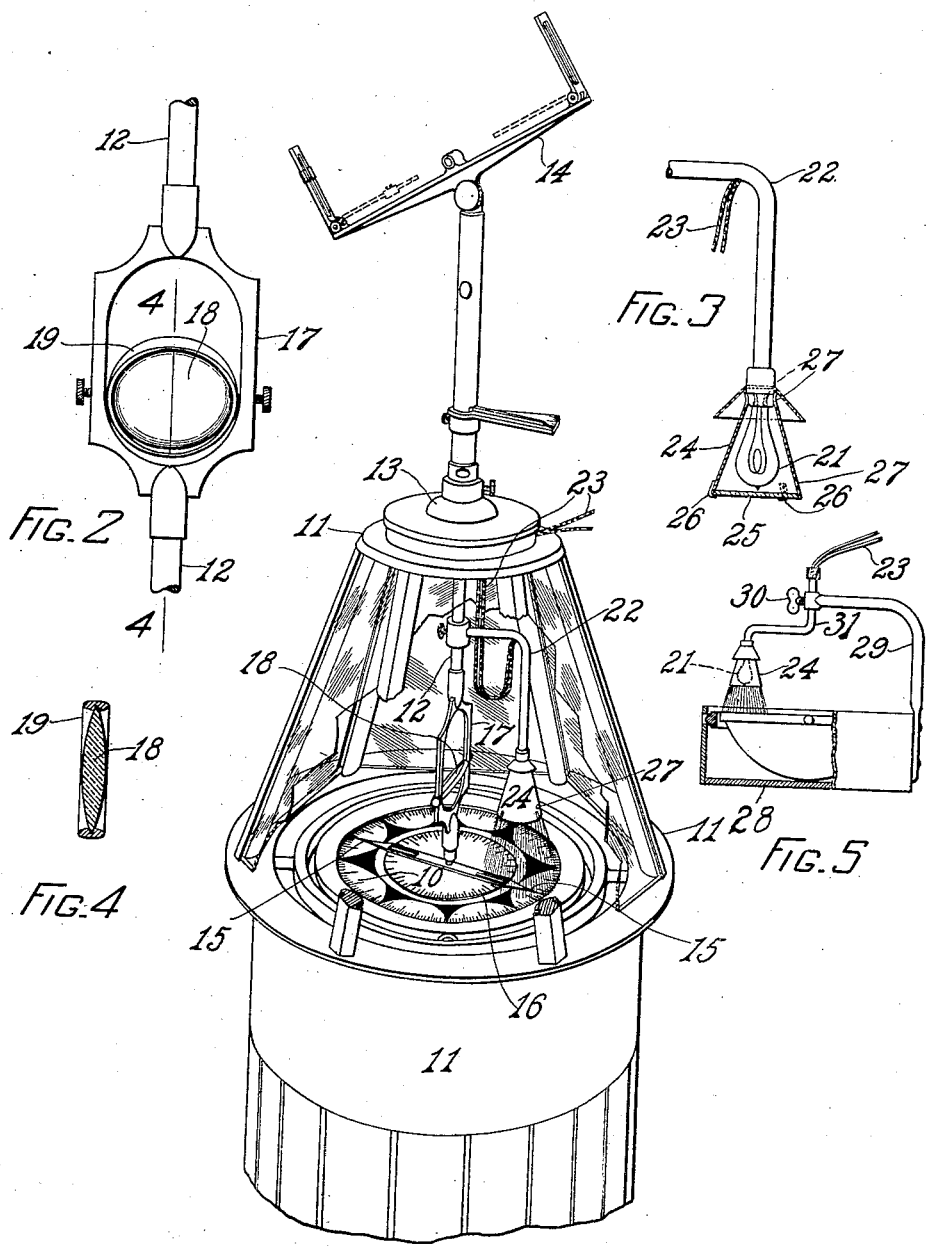

BENJAMIN VARNUM HOW, OF WESTON, MASSACHUSETTS, ASSIGNOR TO MARY ISABELLE HOW, OF WESTON, MASSACHUSETTS.

BINNACLE-LIGHT.

No. 914,840.   Specification of Letters Patent.   Patented March 9, 1909.

Application filed December 21, 1907. Serial No. 407,548.

*To all whom it may concern:*

Be it known that I, BENJAMIN VARNUM HOW, of Weston, in the county of Middlesex and State of Massachusetts, have invented certain new and useful Improvements in Binnacle-Lights, of which the following is a specification.

This invention is in the nature of improvement on that set forth in the United States Patent No. 810,866 granted to me January 23, 1906 for compass indicating apparatus. Said patent shows a ship's binnacle and a compass therein, a rotatable or oscillating vertical shaft mounted centrally on and supported by the binnacle with a sighting tube at the top of such shaft and, at its foot, an indicating pointer alined with the sighting device and supported by the compass dial. My present improvement may be applied to such apparatus or to other forms thereof, and comprise peculiar means of illuminating the compass dial, and an arm, preferably tubular, carrying such means; a magnifying lens adjustably mounted in a loop in the upright shaft to facilitate reading the compass points or degrees on dials of various sizes, such lens preferably having a vertical line across its face registering with a degree mark, or the indicating pointer, the function corresponding to that of a rear sight on a rifle barrel.

In the drawing,—Figure 1 is a perspective view, partly broken away, of a suitable form of binnacle with my improvements applied thereto. Fig. 2 is an enlarged view of the oscillating shaft and adjustable lens. Fig. 3 is a detail of the movable compass light and Fig. 4 a section of the magnifying lens. Fig. 5 is a modification, indicating a compass box with simplified support for the lamp-carrying arm.

The compass 10 will have the usual support on gimbals in any ordinary form of binnacle, such as that shown at 11 in Fig. 1. Centrally over the compass the vertical shaft 12 is mounted in a bearing 13 for oscillation or a limited rotary movement. At the top this shaft carries a pivoted sighting tube or bar 14, and at its foot a radial pointer 15 is alined therewith and rests on the compass dial or on the triangulation plate 16 as in my former patent. Within the binnacle the shaft 12 is formed in three sections,—an enlarged central loop 17 and axial upper and lower extensions, all brazed together for greater stiffness and more perfect alinement.

Within loop 17 I mount an adjustable lens 18, shown inclosed in a marginal ring 19 and having milled knobs on its journals for adjusting it. Such lens may be of any desired form, and serves to magnify the graduations on the compass and triangulation plate and somewhat refract the line of vision. This device, therefore, adapts the instrument to dials of different diameters and binnacles of different heights.

I illuminate the graduated margin of the compass dial and the triangulation plate thereon by means of an incandescent electric lamp 21 supported by the binnacle and movable in the arc of a circle. For this purpose I secure a projecting arm 22 adjustably on the vertical shaft 12 by a set screw or like means and mount such lamp at foot of said arm, through which the conducting wires 23 extend, with considerable slackness, from the lamp outwardly and away from the binnacle to the source of current. Such slackness, indicated in Fig. 1, permits oscillation of the shaft and arm to an extent equal to one or more complete revolutions either way incident to taking observations. They may be secured by a set screw in any desired position. The lamp 21 may be located slightly to one side of the line of vision denoted by the radial pointer 15, or raised sufficiently to avoid obstruction. In order to concentrate the rays of the small lamp employed on a limited portion of the compass dial, a shield or opaque covering 24 surrounds the lamp, to protect the observer's eyes from the intense light, which may also be diminished, if desired, by a ground glass or shaded disk 25 closing the lower end of the shield. Such disk may be insertible and removable by means of spring arms or catches 26 at the base of the shield (see Fig. 3.) The lamp 21, thus inclosed, is liable to become heated, and I provide small perforations 27, as air inlets, to permit a limited circulation, which has a cooling effect. A flaring cap at the upper end of the shield prevents the light showing through these perforations.

In the modification shown in Fig. 5, 28 indicates a casing representing a binnacle to inclose and support a compass properly mounted; 29 represents an upright rod secured to the casing, extended inwardly at top and formed terminally with a bearing over the center of the compass, with a depending angular arm 31 rotatable in such bearing, carrying a lamp which may illuminate any part of the compass margin, a set screw 30, serving to hold it in position.

I claim as my invention:

1. In compass lighting apparatus, a binnacle-like casing inclosing and supporting the compass, a rotatable shaft and arm and a lighting device mounted thereon, both supported on such casing, said device being movable in the arc of a circle around the compass, substantially as set forth.

2. A mariner's compass properly mounted on gimbals and a binnacle, supporting and inclosing the same, in combination with an oscillatory upright shaft supported by the binnacle and an arm projecting from said shaft carrying at its tip an incandescent electric lamp, movable in the arc of a circle and adapted to illuminate any desired part of the compass dial, substantially as set forth.

3. A mariner's compass properly mounted on gimbals, a binnacle supporting and inclosing the same, and an oscillatory vertical shaft supported by the binnacle above the compass dial, in combination with an arm projecting from said shaft, carrying, terminally, an incandescent electric lamp, and with an inclosing shield and shaded, terminal disk for restricting the field and diminishing the intensity of such light, substantially as set forth.

4. A mariner's compass properly mounted on gimbals, a binnacle supporting the same and an oscillating shaft, having a loop or spread portion, supported by the binnacle above the compass dial, in combination with a tiltable magnifying lens located in said loop and provided with lateral bearings engaging the walls thereof, such lens being, thereby adjustably held in position to facilitate taking observations, substantially as set forth.

In testimony whereof I have affixed my signature, in presence of two witnesses.

BENJAMIN VARNUM HOW.

Witnesses:
VINCENT EDWARD SARGENT.
A. H. SPENCER.